Patented Oct. 13, 1931

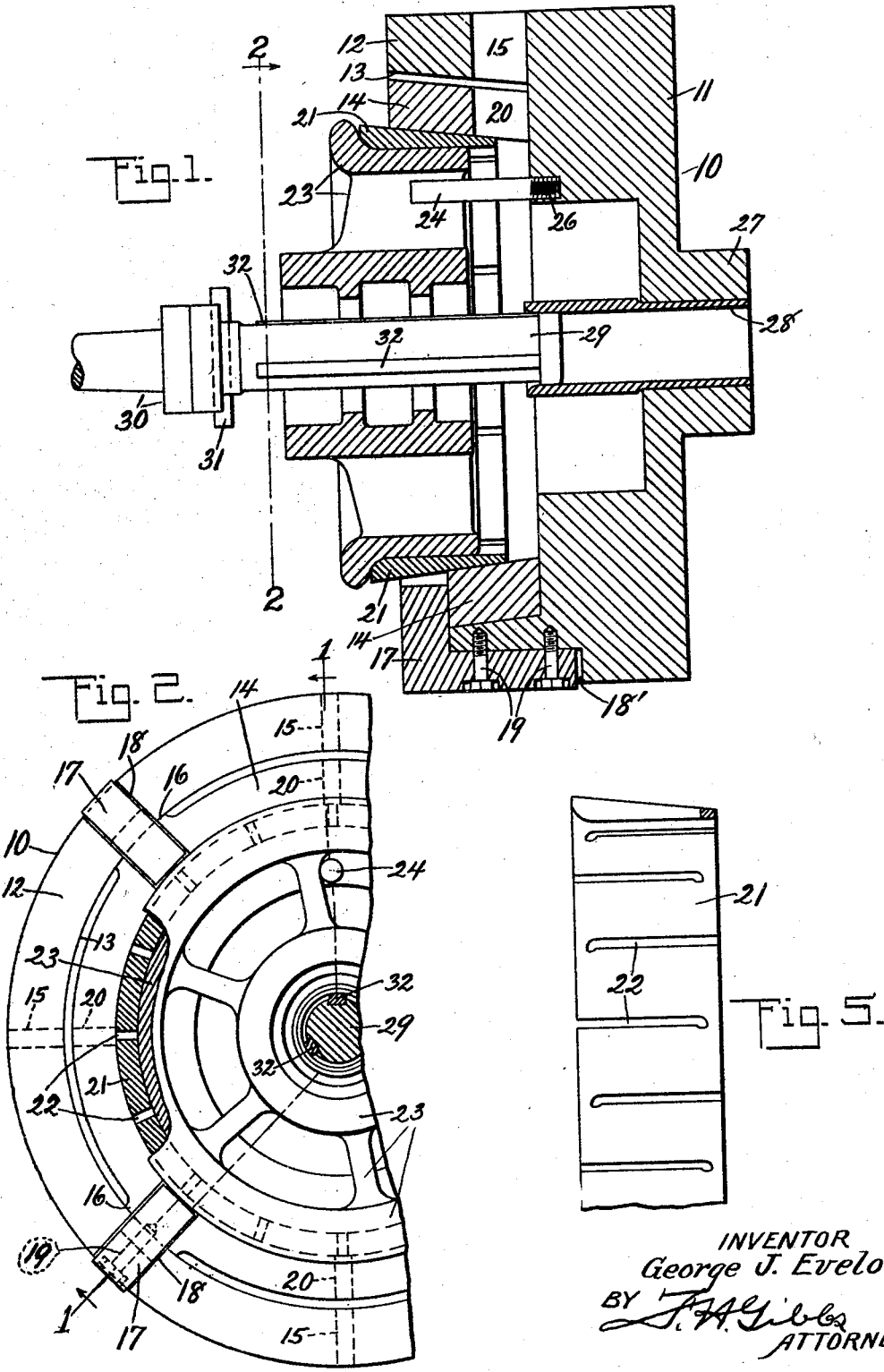

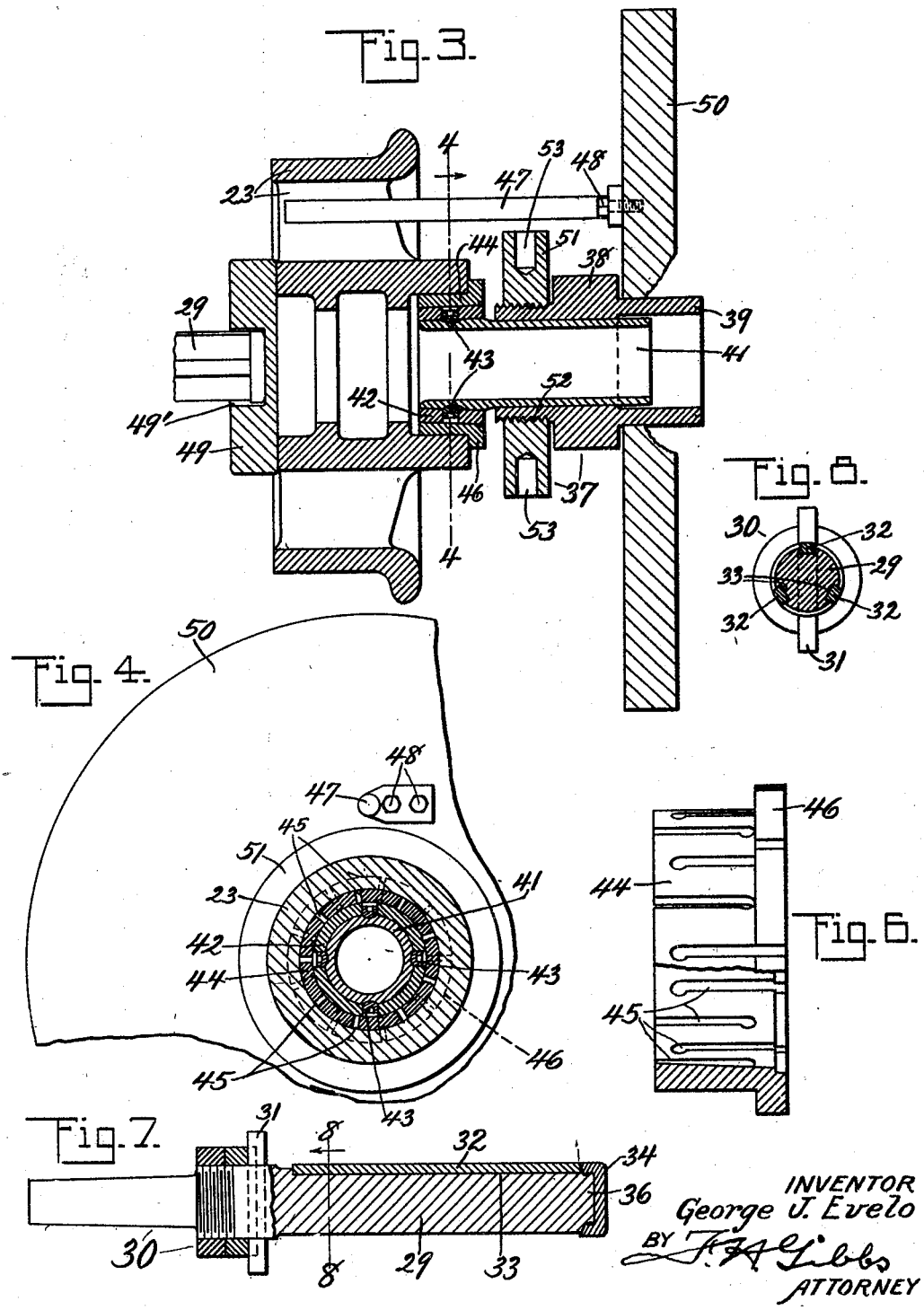

1,827,387

UNITED STATES PATENT OFFICE

GEORGE J. EVELO, OF TERRE HAUTE, INDIANA, ASSIGNOR TO AMERICAN CAR AND FOUNDRY COMPANY, OF NEW YORK, N. Y., A CORPORATION OF NEW JERSEY

CHUCK

Application filed May 28, 1929. Serial No. 366,628.

This invention relates to the manufacture of articles having concentric surfaces thereon, and more particularly to the manufacture of wheels, such as mine or railway car wheels.

An object of this invention is to improve the efficiency of apparatus used for the manufacture of articles of the class described and thereby to simplify the process of manufacture.

Many articles, such as car wheels, for example, have concentric surfaces which can not be conveniently produced with one chucking of the work blank. Furthermore, in the case of cast wheels the tread takes its final form in the mold and the center must then be bored out concentric with the tread. Instances of this kind require the exercise of considerable care and accuracy in setting up the work so as to assure that the surfaces will be concentric. This is particularly true in the case of wheels which are to be equipped with roller bearings, as only very small tolerances are permitted in this class of work. For these reasons, the setting up of a work blank has, heretofore, been a tedious and difficult operation, which, due to the time and skill required, has added considerable to the cost of the finished product.

It also sometimes occurs that a boring tool will yield under the strain of the cut, and thus deviate from its intended path so as to produce an irregular or taper surface where a straight cut is desired. Difficulty has also been encountered with wheels which have been cored off center, for in such cases the boring tool frequently follows the core.

It is a more particular object of this invention, therefore, to provide means for readily and accurately cutting or otherwise producing one surface in concentric relation to another surface and, thus, for expediting and simplifying the manufacture of articles of the class described.

It is also an object of this invention to provide means for maintaining a boring tool in its proper position throughout the boring operation.

A still further object is to provide a device capable of accurately centering and holding a work blank, which device shall be of simple, compact and rugged construction, consisting of few parts, and which shall also be adapted to be readily attached to a standard lathe or similar machine.

It is also an object of this invention to provide for accurately chucking a work blank without the aid of adjusting devices, and thereby, to expedite the work and increase production.

These and other objects are effected by my invention, as will be apparent from the following description and claims taken in connection with the accompanying drawings forming a part of this application, in which:

Figure 1 is a sectional elevation taken substantially on the line 1—1 of Fig. 2 and showing a work blank in place on a chuck with a boring tool in the position which it would occupy just previous to beginning a cut;

Fig. 2 is substantially a half end elevation of the work blank and chuck, a portion of the work blank being broken away to show the position of an expansion ring, this view being taken substantially on the line 2—2 of Fig. 1;

Fig. 3 is a sectional elevation showing a work blank mounted on a modified form of chuck;

Fig. 4 is a section taken substantially on the line 4—4 of Fig. 3;

Fig. 5 is a sectional elevation of the expansion ring used in connection with the apparatus shown in Figs. 1 and 2;

Fig. 6 is an elevational view of the expansion ring used in connection with the apparatus disclosed in Figs. 3 and 4; the lower portion of this expansion ring being shown in section;

Fig. 7 is a longitudinal sectional elevation of a boring tool; and

Fig. 8 is a section taken substantially on the line 8—8 of Fig. 7.

This invention contemplates the provision of an expansible ring which will yieldably fit a surface of a work blank and will also fit a suitable chuck. A work blank with such a ring in place thereon may be placed on a chuck where, by virtue of the resilience of the ring, the blank will be held with sufficient firmness to permit machining or like operations without the aid of other clamping devices. The apparatus is also, preferably, so constructed and arranged that the work blank is automatically centered when it is mounted upon the chuck.

Figs. 1 and 2 of the drawings illustrate the manner in which a car wheel, for example, may be mounted upon a pot chuck in accordance with this invention. The chuck is indicated generally at 10 and comprises a body portion 11 having a bell 12 which is preferably taper bored at 13 to receive a suitable filler ring 14.

In order that access may readily be had to the interior of the chuck for any purpose, such for example as assisting in the removal of a work blank, one or more passages 15 are arranged to extend through the base of the bell 12 at convenient points. Preferably, these passages 15 are in the form of radial holes or slots which are equally spaced circumferentially and so arranged as to be diametrically opposite or substantially so.

The filler ring 14 is preferably provided on its outer surface with a suitable number of circumferentially spaced axially extending seats 16 which fit the taper bore 13 of the bell 12, and the ring 14 is held in place by a suitable number of lugs 17, which may be L-shaped as shown, and engage in notches 18 provided at spaced points about the ring for this purpose. The lugs 17 may be secured to the bell portion 12 in any suitable manner, as by being secured in suitable recesses 18' in the bell by means of bolts 19. The filler ring is also notched or otherwise provided with openings 20 which register with the passages 15 in the bell 12.

The inner surface of the filler ring 14 is tapered as shown to provide a concentric supporting surface for engaging the outer surface of an expansible and contractible ring 21, the latter being shown more clearly in Fig. 5. This ring 21 is provided with a plurality of slots 22 extending transversely of the ring from opposite edges thereof and arranged alternately, as clearly shown in Fig. 5. The inner surface of the ring 21 is concentric with the outer surface thereof and is also adapted to yieldably fit a concentric surface of a work blank, as for example to fit the tread of the car wheel indicated generally at 23. A driving pin 24 is suitably connected to the body portion 11 of the chuck as by being threaded thereto, as indicated at 26, so that this driving pin may extend between the spokes of the wheel 23 and thus serve as a means for imparting rotary motion to the work blank.

The body portion of the chuck 10 is also provided with an axially extending annular hub portion 27 which is adapted for connection to a driving member, as to the headstock spindle of a lathe. While this annular hub portion 27 may be connected to the headstock spindle in any approved manner, it is preferably made to be a light drive fit in the headstock spindle, as this provides for readily assembling the chuck and for expediting the manufacturing processes. A hardened bushing 28 is secured in the hub portion 27 and extends beyond the hub portion to provide a supporting bearing surface for the pilot portion 29 of the boring bar indicated generally at 30. This boring bar 30 is carried by the tailstock (not shown) and is provided with a suitable boring tool 31.

In carrying out the invention with the apparatus thus far described, the work blank may be placed on a table or on the floor and the expansion ring 21 placed upon the tread of the wheel 23, after which the work blank with the ring in place thereon is picked up and mounted upon the chuck by pushing axially against the blank so as to press the expansion ring 21 into firm engagement with the filler ring 14. The inner supporting surface of the filler ring 14, as well as both the inner and outer surfaces of the expansion ring 21, being concentric with the axis of rotation, it is assured that merely mounting the work blank 23 upon the chuck will properly and accurately center the blank and, furthermore, no additional clamping devices are required, nor is any final adjustment necessary as the work blank is automatically centered and gripped by the expansion ring so that work may be begun at once. The work blank may be removed from the chuck by inserting a bar (not shown) through one of the holes 15, so that the bar will act as a wedge or a pry to force the blank and the expansion ring out of the chuck.

The possibility of having the boring tool follow the core of a wheel which has been cored off center is also overcome by providing the boring bar 30 with a long pilot 29 which is, preferably, a good running fit in the extended bushing 28, so that the boring bar will be supported at both ends, and hence, an accurate cut is assured.

Secured to the pilot portion 29 of the boring bar are a plurality of longitudinally extending bearing elements or splines 32 which are preferably dovetailed into circumferentially spaced, longitudinally extending grooves 33 in the pilot portion 29, and the splines 32 are held from axial movement by a cap 34 which is threaded or otherwise secured to the reduced end 36 of the pilot portion 29; the cap being arranged to abut the adjacent ends of the splines and hold them securely in place with their remote ends abutting the closed ends of their respective retaining slots 33. As will be apparent these bearing elements 32 may be easily and quickly removed for replacement when necessary.

With the form of work blank such as that shown in Figs. 1 and 3, it will be apparent that it would be very difficult, and in fact not practical, to attempt to bore out the hub portion of the blank from one end, as some of the interior annular rib portions would prevent the operator from seeing what he was doing. It will also be obvious that with the apparatus disclosed in Figs. 1 and 2 the end portion of the hub of the blank may be readily bored and faced. The completion of this operation, therefore, gives the blank a finished surface concentric with the tread and it will be seen that, if this newly finished surface is accurately mounted upon a chuck, the remainder of the boring may be done accurately from the opposite end of the blank at one set-up. With this object in view, the outer end portion of the hub of the blank is finish bored and faced with the blank set up in the manner described with reference to Figs. 1 and 2. The blank is then, preferably, removed from the chuck 10 and the newly bored portion of the hub is mounted upon the chuck indicated generally at 37 in Figs. 3 and 4.

This form of chuck comprises a body portion 38 having an axially extending hub portion or bushing 39 which, like the annular hub portion 27 of the chuck shown in Fig. 1, is preferably a light drive fit in the headstock spindle of a lathe. The body portion 38 is also bored concentrically and provided with a hardened bushing 41 which is preferably a driven fit in the body portion 38. The bushing 41 extends axially beyond the body portion 38 of the chuck to provide an extended bearing surface for the pilot portion 29 of the boring bar, as explained in connection with Figs. 1 and 2.

In this modification, however, the extending portion of the bushing 41 also carries the filler ring 42, the latter being preferably taper turned and taper bored to fit a correspondingly tapered exterior surface on the extending portion of the bushing, and the filler ring is in this instance secured to the bushing by means of a suitable number of circumferentially spaced set screws 43. An expansion ring 44, as more clearly shown in Fig. 6, is provided with an interior surface which is tapered to fit the outer tapered surface of the filler ring 42 and, as with the ring 21 shown in Fig. 5, this ring 44 shown in Fig. 6 is also provided with a plurality of slots 45 extending alternately from the opposite edges thereof. The outer surface of the ring 44 is not tapered, however, but is straight to fit the straight bore of the hub portion of the work blank, and the ring 44 is also preferably provided with a radially extending flange 46 which is adapted to engage the faced end of the hub of the work blank. While the driving pin 47 may, if desired, be carried by the body member 38 of the chuck, this driving pin 47 is, preferably, carried by the face plate 50 of a lathe, being suitably connected thereto by means of bolts indicated at 48.

The method of mounting the work blank on the chuck 37 is in general the same as that described with reference to Fig. 1, the expansible ring 44 being placed in the previously bored portion of the hub of the wheel 23 and then pushed onto the filler ring 42 of the chuck 37. While the work blank may be manually pushed into the chuck, it is more convenient to place a bar such as the bar 49, across the hub portion of the blank and then to force the pilot portion of the boring bar against the bar 49 by advancing the tailstock. If desired, a suitable recess 49′ may be provided in the bar 49 to receive the end of the pilot 29 to prevent slipping. This is an operation which can readily be performed and which, at the same time, assures that sufficient pressure will be exerted against the work blank to cause it to be firmly gripped by the expansible ring 44. While this method of mounting the work blank by placing a bar such as the bar 49 across the opening in the hub and then advancing the tailstock against this bar was not described in connection with Figs. 1 and 2, it will be obvious that this method may be employed with either form of chuck whenever conditions render this desirable. It will also be obvious that in some cases the bar 49 may be dispensed with and a suitable abutment provided on the tailstock.

Once the work blank is properly mounted upon the chuck, with the driving pin 47 between the spokes or otherwise engaging the work blank in a manner to be capable of imparting rotary motion thereto, the bar 49 is removed and the boring operations are proceeded with as usual. It will also be observed that with this modification of the invention the pilot 29 of the boring bar is supported in the bushing 41 and thus the boring bar is supported at both ends and again it is assured that the hubs will be accurately bored.

In order to provide for readily removing the work blank from the chuck after the machining or other operations have been completed, a nut 51 is threaded upon the body of the chuck, as indicated at 52, and arranged so that as the nut is advanced it will engage the flange 46 of the expansible ring 44 and thus force the ring and the work blank 23 off from the chuck. In order that this may be accomplished with a minimum of effort on the part of the operator, the nut 51 is provided with a suitable number of radially extending holes 53 which are adapted to receive the end of the bar or other instrument capable of acting as a lever, so that by inserting such a lever into one of the holes 53 considerable force can easily be exerted upon the nut 51 to cause the same to force the expansion ring 44 and the work blank 23 from the chuck.

By providing a series of filler rings, each of which is adapted to fit one chuck, but which is also adapted to receive an expansion ring capable of holding a different size of blank, it is possible with each form of the invention disclosed to use the same chuck for holding several different sizes of blanks. To effect such a change in the capacity of the chuck 10 shown in Fig. 1, it is merely necessary to remove the lugs 17 and to replace the ring 14 with a similar ring of the desired size. Likewise, with the chuck 37 shown in Fig. 2, a change in capacity is effected by removing the set screws 43 and replacing the filler ring 42 with a similar ring having the proper outside diameter. In this way it is possible to provide for accurately chucking and boring blanks of different sizes without providing a corresponding number of chucks, many of which would be idle most of the time. It will also be apparent, however, that when the blanks are all of the same size, the filler ring may be dispensed with and the expansion ring made to fit directly on the chuck body.

Furthermore, it will readily be seen that a blank is automatically centered and chucked by the mere act of bringing the expansion ring to its seat upon the filler ring. No clamping or final adjustment is necessary, and this alone makes possible a reduction in the piece work price, increases production and reduces the unit cost. The cost of production is further reduced and the total production increased due to the reduction in the number of finished articles, such as wheels, which would ordinarily be rejected due to being bored off center, or with tapered bores, or with the opposite ends of the bore not concentric and true. The more accurate machining also prolongs the life of wheels to some extent.

While some of the preferred forms of this invention, together with preferred modes of practicing the same, have been shown and described, it will be obvious that various modifications will occur to those skilled in the art to which the invention appertains, and it will be understood that various changes may be made without departing from the scope thereof, and that the invention is not limited except as indicated by the appended claims.

What is claimed is:

1. In a chuck for holding a wheel, the combination of a body member having an axially extending, annular hub portion adapted to be connected with a rotatable lathe part, means providing a supporting surface on the body member concentric to the axis of rotation of the rotatable lathe part, a resilient ring having concentric surfaces adapted to yieldably fit the supporting surface of the body member and a surface of the wheel, respectively, and tubular means concentrically disposed in the body member for receiving the pilot portion of a boring bar whereby the boring bar is maintained concentric with respect to the said supporting surfaces.

2. The combination set forth in claim 1 wherein a bushing is concentrically disposed in the body member and extends into the annular hub portion thereof to provide an extended bearing for the pilot of a boring bar.

3. In a lathe, a chuck for holding a wheel, the combination of a body member adapted for connection with a driving member, means providing a concentric supporting surface on the body member, an expansible and contractible ring having concentric surfaces adapted to yieldably engage the supporting surface of the body member and the perimeter of the wheel, respectively, for holding the work blank, and a drive bar connected to the body member and coacting with the wheel for transmitting rotary motion from the driving member to the wheel.

4. In a lathe, a chuck for holding a wheel and adapted to be connected to the lathe headstock, a boring bar adapted to be carried by the lathe tailstock, and means for effecting boring of the wheel hub concentric to the perimeter of the wheel comprising a pilot portion on the boring bar, a plurality of bearing elements on the pilot portion, a cap on the pilot portion for retaining said bearing elements in position, and a guiding bearing in the chuck concentric with the axis of rotation of the latter into which the pilot portion of the boring bar extends and with which said bearing elements contact during relative movement between said boring bar and chuck.

5. In a chuck for holding a wheel, a recessed body member having an axially extending hub for attachment to a rotatable lathe part, attachable means providing a supporting surface within the recess in said body member, a resilient member fitting the supporting surface and the perimeter of a wheel for supporting the wheel for rotation with the chuck, and a tubular guide element secured to the hub at the axis of rotation thereof and projecting into the recess in the body member for receiving and guiding a lathe part.

In witness whereof I have hereunto set my hand.

GEORGE J. EVELO.